United States Patent [19]
Ishibashi et al.

[11] Patent Number: 4,998,235
[45] Date of Patent: Mar. 5, 1991

[54] FOCUS DETECTION SYSTEM FOR AN OPTICAL DISK DRIVE USING PHOTO SENSOR ELEMENTS IN THE FAR FIELD OF INFORMATION PITS

[75] Inventors: Hiromichi Ishibashi, Toyonaka; Shinichi Tanaka, Kyoto; Akira Matsubara, Takatsuki; Tsuyoshi Okada, Yokohama, all of Japan

[73] Assignee: Matsushita Electric Industrial Co., Ltd., Kadoma, Japan

[21] Appl. No.: 272,054

[22] Filed: Nov. 14, 1988

[30] Foreign Application Priority Data

| Nov. 17, 1987 | [JP] | Japan | 62-290030 |
| Nov. 17, 1987 | [JP] | Japan | 62-290031 |
| Aug. 31, 1988 | [JP] | Japan | 63-216571 |

[51] Int. Cl.$^5$ .............................. G11B 7/00
[52] U.S. Cl. ................. 369/44.36; 369/44.41
[58] Field of Search ............. 250/201.4; 369/44.34, 369/44.36, 44.41, 44.42, 124, 44.35, 109

[56] References Cited

U.S. PATENT DOCUMENTS

| 4,006,293 | 2/1977 | Bouwhuis et al. | |
| 4,025,784 | 5/1977 | Lehureau et al. | 369/109 |
| 4,051,527 | 9/1977 | Braat | |
| 4,097,730 | 6/1978 | Korpel | 369/44.24 |
| 4,243,848 | 1/1981 | Utsumi | 369/44.35 |
| 4,819,220 | 4/1989 | Miyazaki et al. | 369/44.41 |
| 4,888,757 | 12/1989 | Fujita | 369/44.34 |

FOREIGN PATENT DOCUMENTS

| 2302646 | 9/1976 | France . |
| 60-214429 | 10/1985 | Japan . |
| 2059664 | 4/1981 | United Kingdom . |
| 2196115 | 4/1988 | United Kingdom . |

OTHER PUBLICATIONS

Patent Abstracts of Japan, vol. 7, No. 32, (p.-174)(1177), Feb. 8, 1983; JP-A-57-183639, (Hitachi Seisakusho K.K.), Nov. 12, 1982.

Primary Examiner—Donald McElheny, Jr.
Attorney, Agent, or Firm—Wenderoth, Lind & Ponack

[57] ABSTRACT

An apparatus is described for reading/writing an optical recording carrier, which have information pits aligned in a track. In order to get a focus error signal, the apparatus has two pairs of photo sensor elements, two phase detection circuits for the two pairs of photo sensor elements, and an adder circuit for adding outputs of the two phase detection circuits. The elements are placed symmetrically about an optical axis in a far field area of the pits.

8 Claims, 8 Drawing Sheets

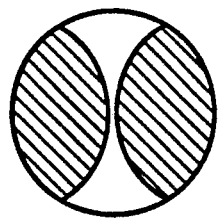
FIG. 3a
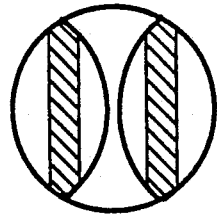
FIG. 3b
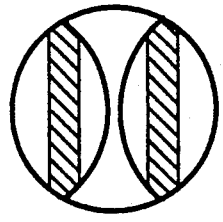
FIG. 3c
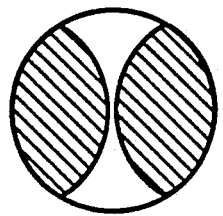
FIG. 3d
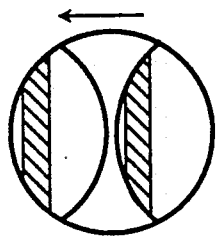
FIG. 3e
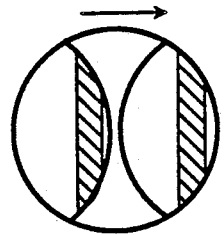
FIG. 3f
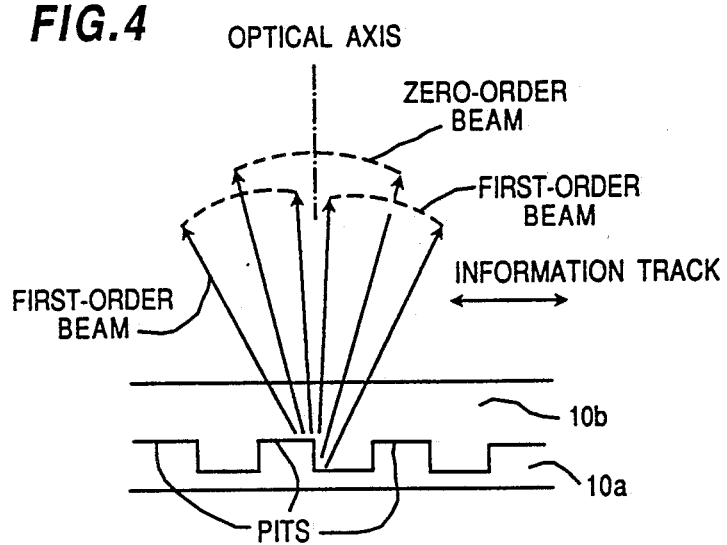

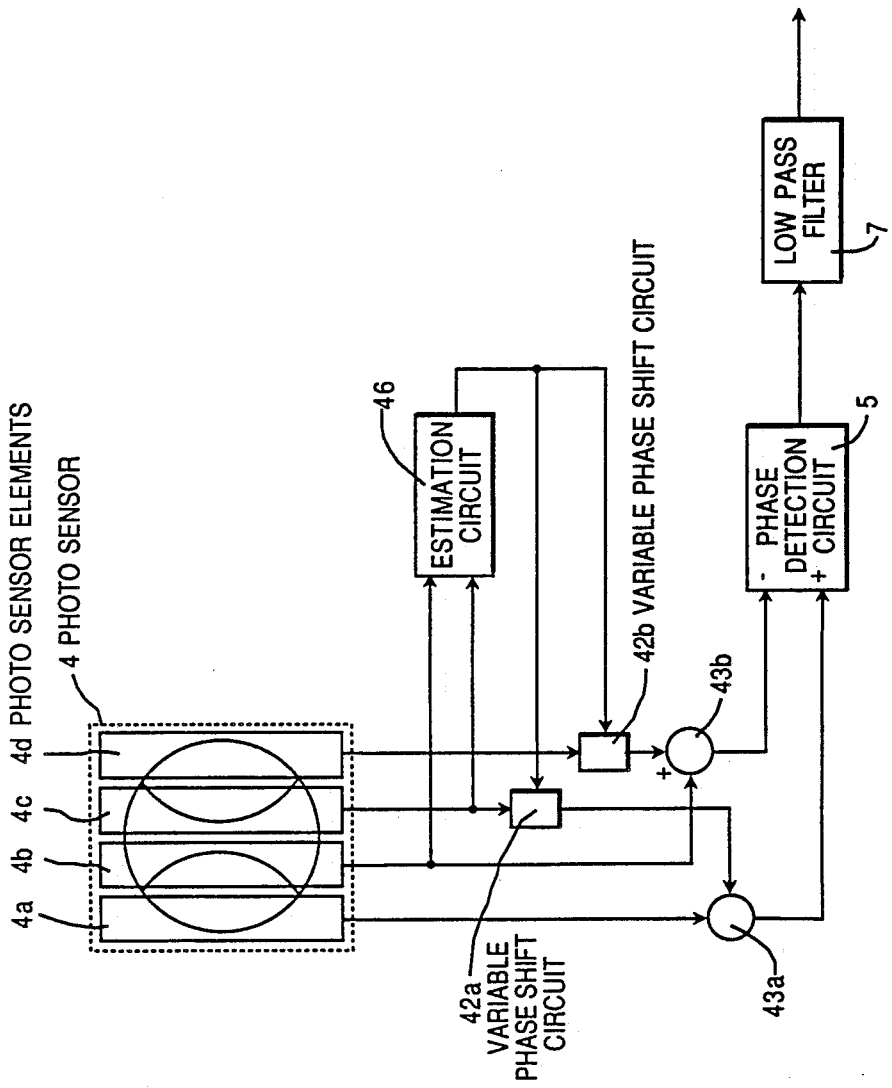

FOCUS DETECTION SYSTEM FOR AN OPTICAL DISK DRIVE USING PHOTO SENSOR ELEMENTS IN THE FAR FIELD OF INFORMATION PITS

BACKGROUND OF THE INVENTION

1. Field of the Invention

This invention relates to an apparatus for reading/writing an optical record carrier such as an optical disk. The apparatus comprises a radiation source such as a semiconductor laser diode, an objective lens focusing a light beam from the radiation source on the record carrier, and a focusing detection system which converts the light beam reflected from the record carrier into an electrical signal and produces therefrom a focusing error signal.

2. Description of the Prior Art

Such apparatus is known from the U.S. Pat. No. 4,051,527, issued Sept. 27, 1977. The apparatus derives a focus error signal from a far field image of an information structure, which is typically composed of a plurality of pits aligned along a spiral track formed on the record carrier. The focusing detection system comprises a photo sensor divided into two separate elements and a phase detection circuit. The photo sensor is disposed in the far field of the information structure at one side of a plane defined by the optical axis of the objective lens and a line normal to the information track. When the information structure of the optical disk is around the focal point of the objective lens, the reflected light beam is diffracted to a zero-order beam and higher-order beams. In the far field area, those diffraction beams, overlapping one another, produce bright and dark interference stripes the period of which is a function of the focus error. Furthermore, when the record carrier is rotating, the lines also move in the parallel direction to the projected track. The direction of the movement depends upon whether the focus error is positive or negative. For example, when the focus error is positive, that is, distance between the information structure and a principal plane of the objective lens is longer than a focal length of the objective lens, the stripes move forward, i.e., in the direction of the disk rotation, and when negative, backward.

Such behavior of the stripes in the far field can be detected as a phase difference between outputs of the two sensor elements. They are located in the half area of the far field, and their divided line is vertical to the line which is parallel to the projected track. Therefore, when one of the elements detects one of the interference stripes as a variation of light power, the other detects the same one after a time lag which is approximately in proportion to the focusing error. Since each element converts a variation of the strength of light to an electric signal, the time lag is converted to a phase difference between the both signals. When the focusing error is very small, the detected phase difference is almost zero because the period of the stripes is larger enough than the width of each detector. But the larger the focusing error becomes, the bigger the phase difference becomes. When the period of the stripes is almost equal to the width of the elements, the phase difference becomes almost 180 degrees, which is the maximum focusing error which the system can detect. The phase detection circuit converts the phase difference to an electric signal, which becomes a focusing error signal after passing through a low-pass filter.

In the above-described priory art, however, the focusing error signal is susceptible to a defect on the surface of the record carrier. The optical disk comprises a recording material layer formed on a transparent substrate having a thickness of almost 1 mm. The light beam from the objective lens radiates the recording material layer through the substrate. The substrate protects the information on the recording material layer from destruction. Even though the surface of the substrate is slightly scratched, the information structure on the recording material layer is not affected because the information structure is in the near field region while the defect in the far field region. However, in the above-described system, the defect in the far field region affects the focusing error signal which is derived from the far field image of the information structure. For example, if there is a black spot on the illuminated region on the surface of the substrate, its image is projected on the sensor. Furthermore, since the optical disk is rotating, the image of the defect moves from the one element to the other element of the sensor. At this time, the sensor detects the defect as electric signals which have a phase difference. After all the phase difference causes a focusing disturbance.

SUMMARY OF THE INVENTION

Accordingly, it is an object of this invention to provide a focusing detection system stubborn to the defect on a record carrier.

According to the present invention, in order to achieve the above object, there disposed a photo sensor comprising the first to the fourth elements aligned sequentially in a direction of an image of a track in a far field and phase detection means for deriving a focus error signal by detecting phase differences among outputs from those elements. An important point is that an optical axis is located between a second element and a third element.

An embodiment of an apparatus in accordance with the invention with the photo sensor and the phase detection means is characterized in that outputs of the first element and the second element are fed to a first phase detection means and outputs of the third element and the fourth element are fed to a second phase detection means. Furthermore, it is characterized in that outputs of those phase detection circuits are added by an adder means, the output of which becomes a focusing error signal after passing low-pass filter.

Another embodiment of the invention is characterized in that outputs of the first element and the fourth element are fed to the first phase detection means and outputs of the second element and the third element is fed to the second phase detection means.

Still another embodiment of the invention is characterized in that an added output of the first element and the third element and an added output of the second element and the fourth element are fed to phase detection means.

BRIEF DESCRIPTION OF THE DRAWINGS

The invention will now be described in more detail with reference to the drawing, in which:

FIG. 3a-3f, FIG. 4, FIG. 5, FIG. 6, FIG. 7, FIG. 8a-8d are drawings for explaining the principle of the invention;

FIG. 17 is a block diagram showing an embodiment of an apparatus in accordance with the seventh embodiment.

DESCRIPTION OF THE PREFERRED EMBODIMENTS

Figure 1:
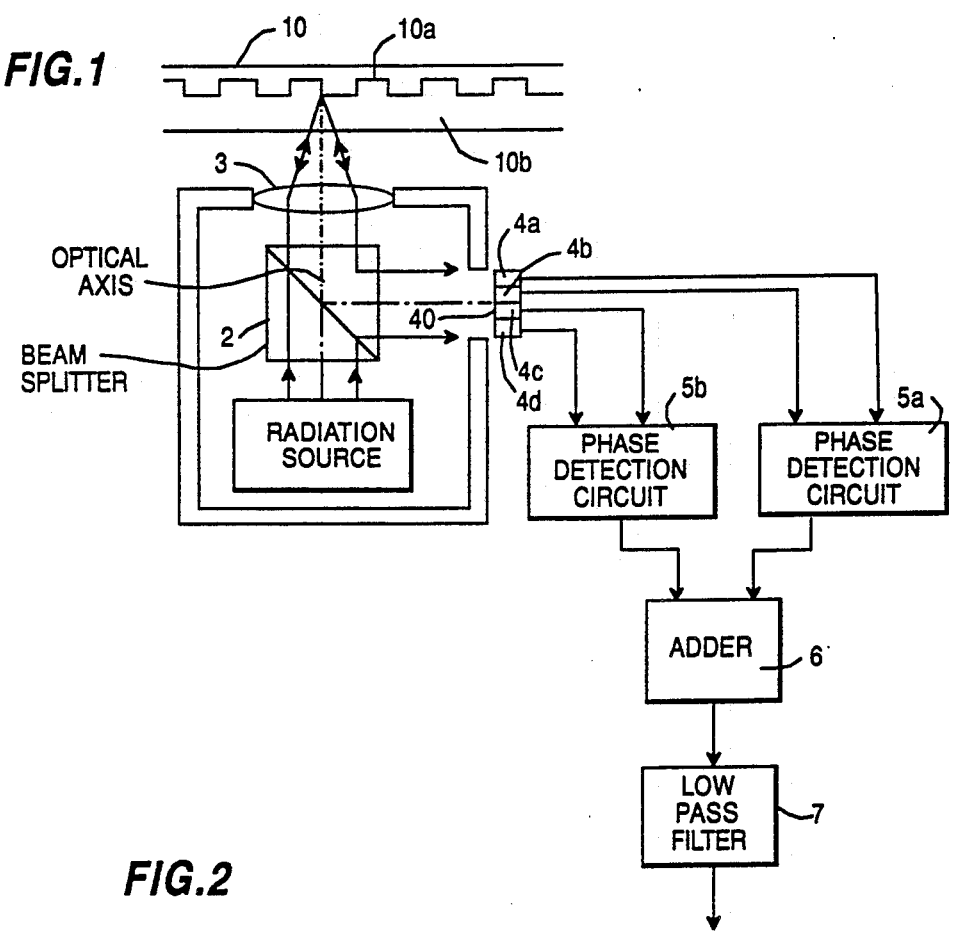
FIG. 1 is a construction diagram showing an embodiment of an apparatus in accordance with the invention.
Figure 2:
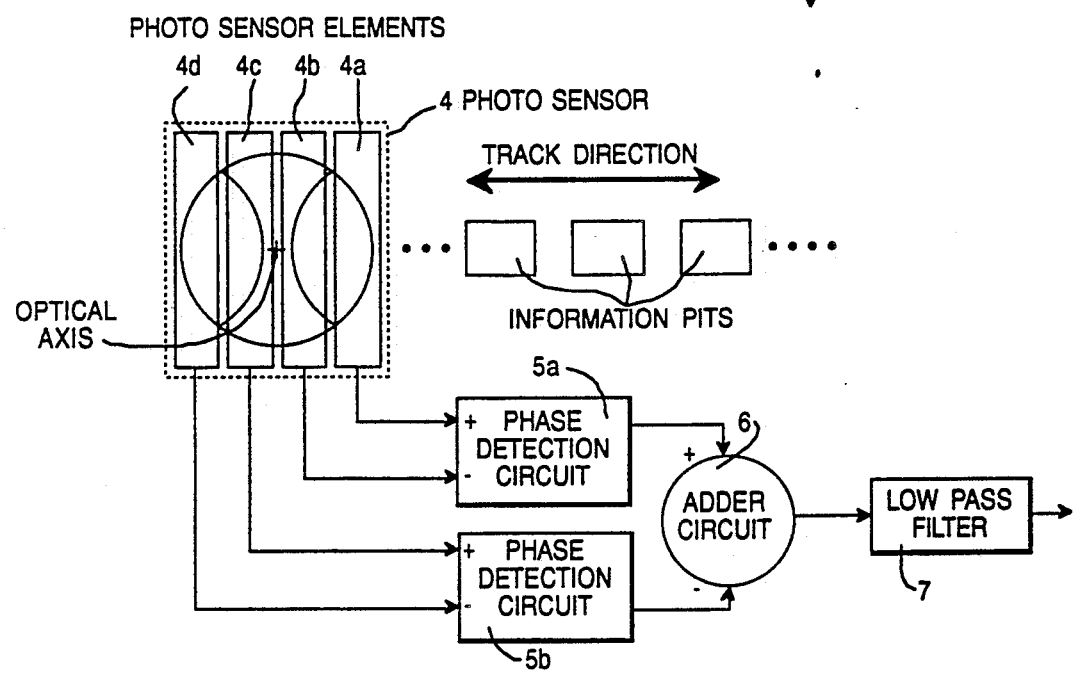
FIG. 2 is a block diagram showing a part of the embodiment in FIG. 1.

Referring first to FIG. 1 and FIG. 2, there is illustrated a focus detection system as an embodiment of the present invention. A a collimated laser beam emitted from a radiation source 1 passes through a beam splitter 2 and an objective lens 3 to focus on an optical disk 10. The optical disk 10 comprises a recording layer 10a and a substrate 10b. On the recording layer 10a, there is recorded information as optically readable pits arranged in a form of a spiral track structure. These pits have been produced by being pressed beforehand or recorded as black/white marks by a strong laser beam. A backcoming light beam is reflected by the beam splitter 2 and incidents on a photo sensor 4. The photo sensor comprises four photo sensor elements 4a, 4b, 4c, 4d, which are arranged in a line parallel to the far field image of the information track on the recording layer 10b as shown in FIG. 2. Furthermore, the photo sensor element 4a and the photo sensor element 4d are located symmetrically about the optical axis and so are the photo sensor element 4b and the photo sensor element 4c. An output of the photo sensor element 4a is fed to a positive input ('+') of a phase detection circuit 5a and an output of the photo sensor element 4b is fed to a negative input ('−') of the phase detection circuit 5a. Similarly, an output of the photo sensor element 5c and an output of the photo sensor element 5d are fed to a positive input and a negative input of a phase detection circuit 5b respectively. Each phase detection circuit outputs an electric signal in proportion to a phase difference of the positive input signal from the negative input signal. The outputs of both phase detection circuits are added by an adder circuit 6 and the output of the adder circuit 6 is fed to a low pass filter 7 so as to remove ripples in high frequency. An output of the low pass filter 7 is regarded as a focusing error signal, which is fed back to a focusing actuator to radiate a focused beam spot on the information structure accurately.

In order to better understand the invention, a prior art focus detection system will first be described with reference to FIG. 3a,3b,3c,3d,3e,3f,4,5,6,7,8a,8b,8c,8d.

FIG. 3a,3b,3c,3d,3e,3f show the far field patterns of information structure on the recording layer 10a. These patterns are caused by mutual interference between a zero-order sub-beam and higher-order subbeams diffracted by the pits on the recording layer 10a as shown in FIG. 4. It may be explained that the pits on the recording layer 10a works as a two-dimensional grating. In FIGS. 3a-3f only the zero-order sub-beam and the first-order sub-beams are drawn, and especially, these figures illustrate the first-order sub-beams occurring in the direction parallel to the information track. FIG. 3a shows the far field pattern when the recording layer 10a is at the focal point of the objective lens 3. In this case there yield two overlapping areas by the zero-order sub-beam and the first-order sub-beams. FIG. 3b and FIG. 3c show far field patterns respectively when the distance between the recording layer 10b and the principal plane of the objective lens 3 is shorter or longer than the focal length of the objective lens 3. Bright/dark stripes appear in the overlapping areas, and width of those stripes become narrower as a function of a focusing error.

FIGS. 3d-3f show far field patterns when the information structure moves slightly relative to the objective lens 3 in the parallel direction to the information track. When the laser beam focuses on the information structure, the brightness in the overlapping areas varies while the power distribution in each area is uniform (FIG. 3d). When the information structure is out of focus, the stripes move in the direction of the movement of the pits (FIG. 3d, FIG. 3e). Furthermore, when the focus error is positive—i.e., the distance between the recording layer 10b and the principal plane of the objective lens 3 is shorter than the focal length, the stripes move in the same direction as the movement of the pits, and when negative, in the opposite direction as indicated by arrows.

Figure 5:
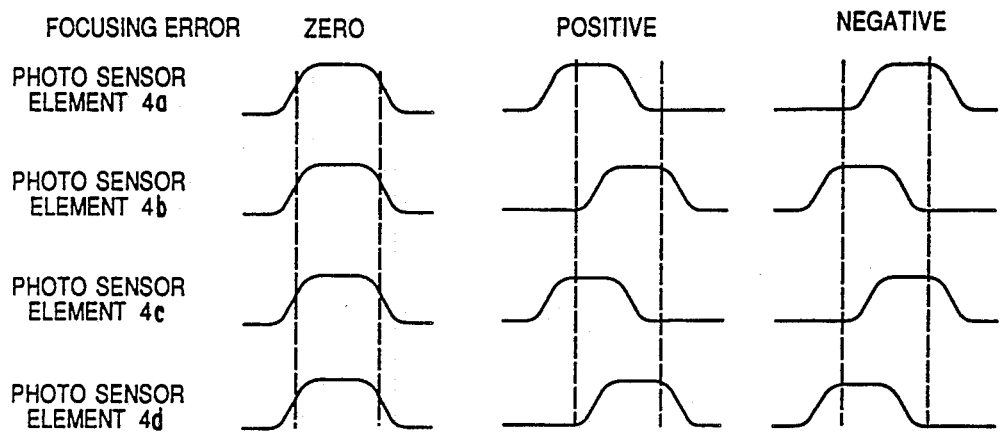

Photo sensor elements 4a, 4b, 4c, 4d output electrical signals in proportion to the light strength on the respective elements. When the power distribution moves as described above, each electrical signal varies as illustrated in FIG. 5. In the case that the pits are at the focal point (focusing error is zero), the four signals varies in phase. In the case that the focus error is positive, a phase of the signal from the photo sensor element 4a and a phase of the signal from the photo sensor element 4c advance and a phase of the signal from the photo sensor element 4b and a phase of the signal from the photo sensor element 4d delay. In the opposite case, that is, in the case that the focus error is negative, a phase of the signal from the photo sensor element 4a and a phase of the signal from the photo sensor element 4c delay and a phase of the signal from the photo sensor element 4b and a phase of the signal from the photo sensor element 4d advance. Therefore, a focusing error signal can be get from phase differences of those signals.

According to the present invention, the focusing error signal is derived by adding the outputs of the phase detection circuits 5a and 5b and filtered by the low pass filter 7. The phase detection circuit 5a detects the phase difference (phase advance or delay) of the output signal of the photo censor element 4a from that of the photo sensor element 4b, and the phase detection circuit 5b detects the phase difference of the output signal of the photo sensor element 4c from that of the photo sensor element 4d. The phase detection circuits 5a and 5b output almost the same quantity of phase difference signals since the photo sensor elements 4a and 4b and the photo sensor elements 4d and 4c are arranged symmetrically about the optical axis in the far field. Therefore the focus error signal, produced by adding these two signals, is twice as much as each signal.

Figure 6:
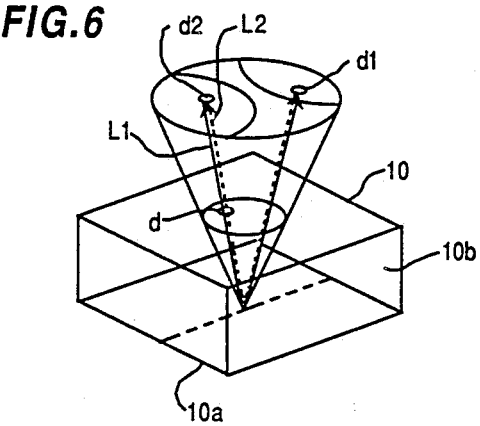
Figure 7:
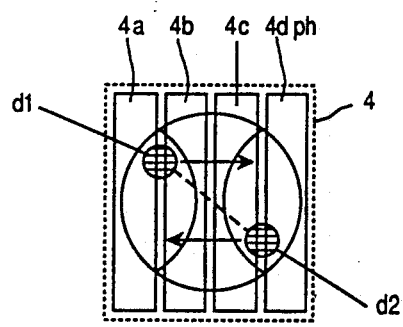
Figure 8A:
Figure 8B:
Figure 8C:
Figure 8D:

This adding operation not only double the sensitivity of the focus error signal in comparison with the prior art but cancel the effect of a defect 'd' on a surface of the substrate 10b of the optical disk 10 as shown in FIG. 6. When the defect is in the far field, i.e., on the surface of the substrate 10b or somewhere in the light path between the radiation source 1 and the recording layer 10a, its image is projected on the photo sensor elements 4a, 4b, 4c, 4d as two images—one is a direct image 'd2' caused by a light beam L2 in FIG. 6 and the other a reflected image 'd1' caused by a light beam L1 in FIG. 6. Furthermore when the optical disk is rotating, the two images move in the opposite direction to each other. In the prior art such moving images cause disturbances on the focus error detection because the moving images are regarded as varying distribution, which is mistaken for a focus error. But in this invention, all of effects by such defects are canceled. As shown in FIG. 7 the images on the photo sensor 4 move in the opposite direction to each other. The phase detection circuit 5a detects the image d1 moving from the photo sensor element 4a to the photo sensor 4b. At the same time, the phase detection circuit 5b detects the image d2 moving from the photo sensor element 4d to the photo sensor element 4c, but the focus disturbance noise detected here is opposite to that by the phase detection circuit 5a. Therefore both disturbances are canceled.

FIG. 8a–8d show typical examples of outputs from the photo sensor elements 4a–4d when there is a defect on the surface of the substrate 10b. Those figures correspond to signals from the elements 4a–4d respectively. In the FIGS. 8a and 8d, the rising edges of the pit signals by the element 4a and the element 4d are eroded by the defect. The former caused by the image d1 and the latter by the image d2. Similarly the falling edges of the pit signals by the elements 4b and 4d are eroded. Those erosions cause phase differences since the edges move from the neutral positions when it were not for the defect. In this case, the phase difference between the outputs from the photo sensor element 4a and the photo sensor element 4b is opposite to the phase difference between the output from the photo sensor element 4c and the photo sensor element 4d. Consequently, the phase differences caused by the defect are canceled when both are added.

Figure 9:
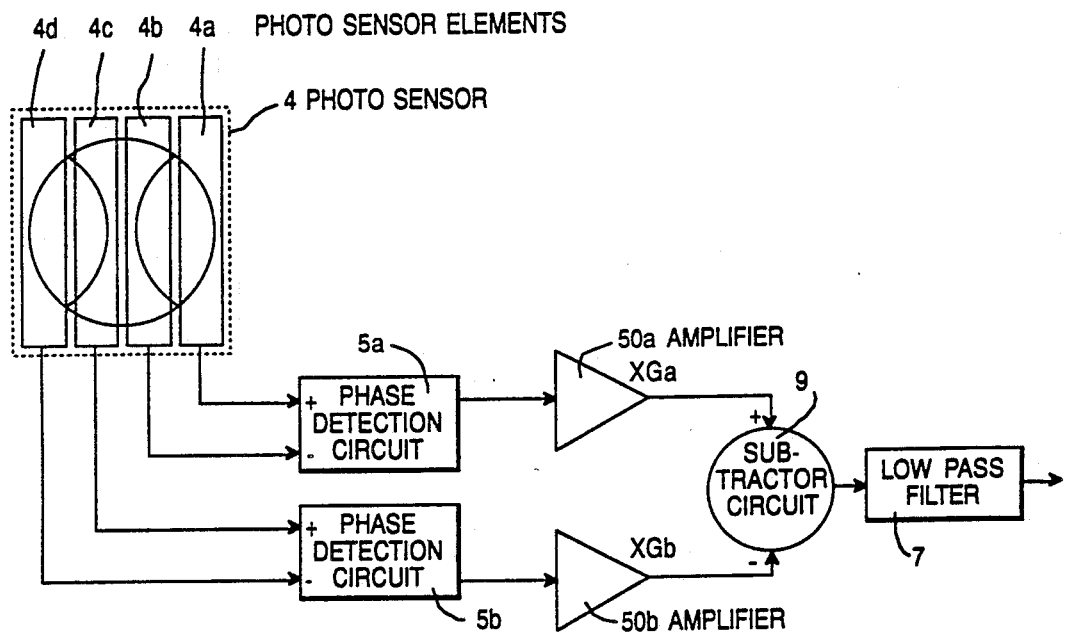
FIG. 9 is a block diagram showing a second embodiment of an apparatus in accordance with the invention.

Referring now to FIG. 9, there is illustrated in a block diagram a focus error detection system as a second embodiment of the present invention. Outputs of the photo sensor element 4a and the photo sensor element 4d are fed to positive and negative inputs of the phase detection circuit 5a respectively and outputs of the photo sensor element 4b and the photo sensor element 4c are fed to positive and negative inputs of the phase detection circuit 50b respectively. Outputs the phase detection circuits 5a and 5b are subtracted by a subtractor circuit 9 after amplified by amplifiers 50a and 50b which have different gains Ga, Gb from each other.

In prior art, deviation of the shape, especially the height or the depth, of a pit causes focus offset. As shown above, when the information pit is as small as the wavelength of the light beam, i.e., 1 um or so, only the zero-order and the first-order diffraction beam incident on the pupil of the objective lens 3. In such case, the light power distribution is uniform inside the overlapping areas in the far field when there is no when there is no focusing error. But when the pit is larger than the wavelength, not only the first-order but higher-order beams come into the pupil. In this case the light power distribution is no more uniform even when there is no focusing error. When the information structure moves, the light power distribution on the photo sensor moves. In detail, the light power distribution is symmetric about the optical axis of the far field in the case that the depth or height of the pit is $n\lambda/4$ (n:integral number, $\lambda$:wavelength of the light beam) or the information structure is made of marks the reflective index of which is different from that of ground. But in other cases, the light power distribution is asymmetric. Furthermore, the asymmetric distribution moves in accordance with the movement of the pit. This means that the phase difference appears even when there is no focusing error. The phase difference, of course, becomes a focusing offset.

Figure 10A:
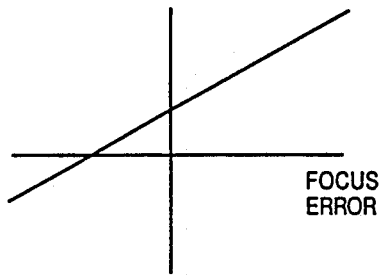
FIGS. 10a & 10b are drawings showing the principle of the second embodiment.
Figure 10B:
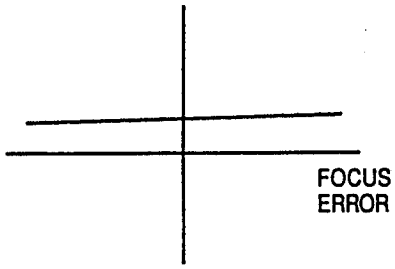

In the focus error detection system of the present invention, the focus offset is almost canceled by subtracting one phase detection signal from the other phase detection signal after amplified by respective gains. FIG. 10a,10b show the outputs of the phase detection circuit 5a,5b respectively. Horizontal axes are focus errors an vertical axes are outputs of the phase detection circuits. Phase difference signals as a function of focusing errors with offsets are obtained both from the phase detection circuits 5a and 5b. But a sensitivity ( $\Delta$output/$\Delta$focus error ) of the system constituted by the photo sensor elements 4b and 4c (inner elements) and the phase detection circuit 5b is far smaller than that of the system constituted by the photo sensor elements 4a and 4d (outer elements) and the phase detection circuit 5a, while the offsets of both are almost the same. It shows that if the output of the phase detection circuit 5b is subtracted from that of the phase detection circuit 5a in proper gain, the offset an be removed. Gains of the amplifiers 50a and 50b are set properly so as to make the offset negligible. In a typical case, according to our study, the gain of the amplifier 50a is 0.5 when the gain of the amplifier 50b is 1.0 when the far field light beam is divided almost equally.

Figure 11:
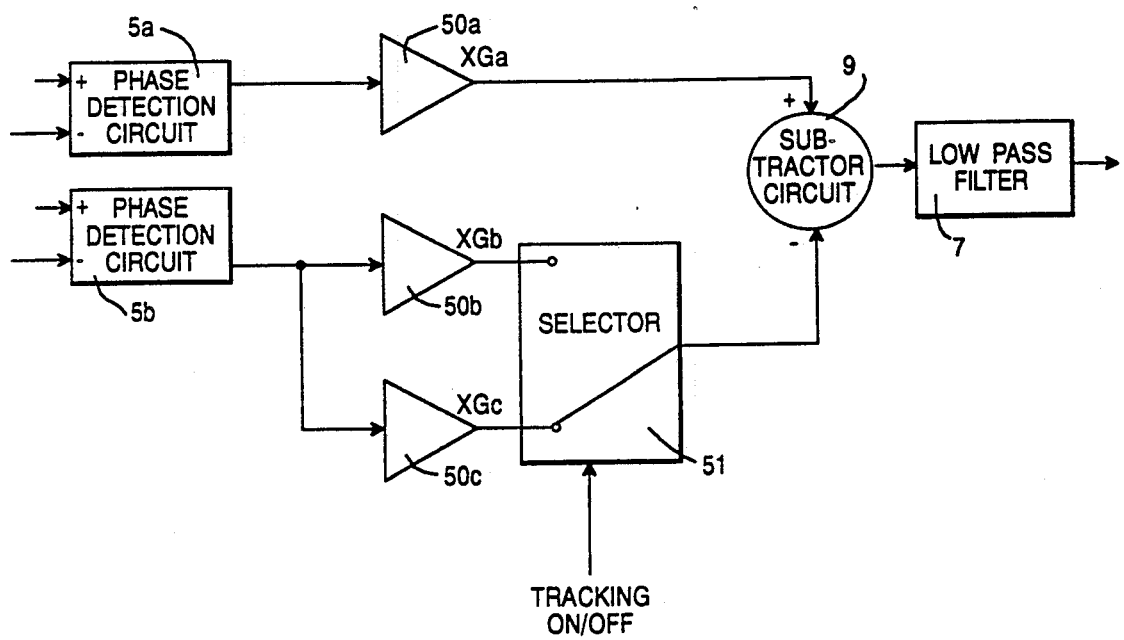
FIG. 11 is a drawing showing an embodiment of an apparatus in accordance with the third invention.

A third embodiment of the present invention will now be described. FIG. 11 is a partial block diagram showing the third embodiment. The amplifier 50b or an additional amplifier 50c is selected by a selector 51 in accordance with whether or not the light beam is constantly on the information track. Other construction is the same as that of the second embodiment.

Figure 12A:
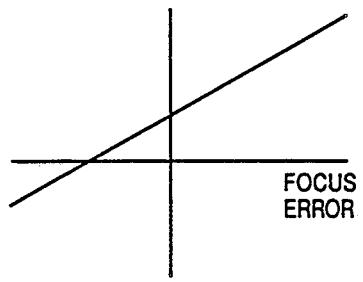
FIGS. 12a & 12b are drawings explaining the principle of the third embodiment.
Figure 12B:
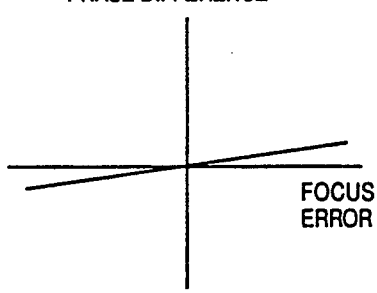

The focus offset can not be canceled when the light beam spot is out of the information track. FIG. 12a and FIG. 12b show the phase detection signals obtained from the outer elements 4a,4d and from the inner elements 4c,4d respectively when the spot is in the midst of two adjacent tracks. The phase offset by the inner elements 4c,4d is much smaller than that in case of ontracking. Therefore, even if the gains of the amplifier 50a and 50b are adjusted properly for the on-track operation, i.e., reading or writing, the focus offset can not be canceled when the light beam is not on the track. It means that a focus servo operation will become unstable during track search because a disturbance synchronized with track-crossing is imposed on a focus servo system. The objective lens 3 will go up and down during track search.

Therefore, during off-track operation, gain for the inner elements 4a,4d and that for the outer elements 4b,4c should be set so as to minimize the deviation of the focus offset. The selector 51 switches from the amplifier 50b to the amplifier 50c having a gain Gc while the track following servo is not under operation.

Figure 13:
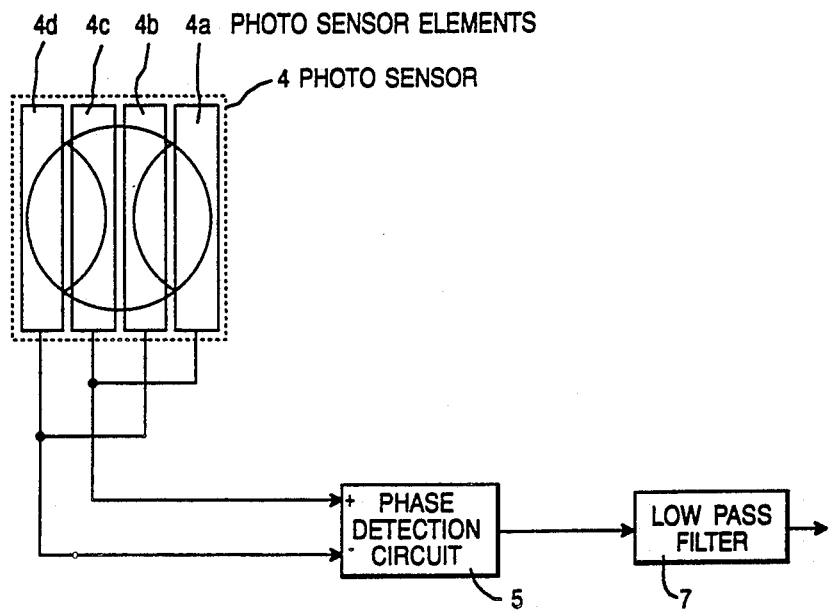
FIG. 13 is a block diagram showing an embodiment of an apparatus in accordance with the fourth embodiment.

A fourth embodiment of the present invention will now be described. FIG. 13 is a partial block diagram of the fourth embodiment. The output of the photo sensor element 4a and the output of the photo sensor element 4c are connected with each other, and the output of the photo sensor element 4b and the photo sensor element 4d are connected with each other. Outputs of these two pairs of elements are fed to positive and negative inputs of a phase detection circuit 50.

In this case, the photo sensor element 4c works as a defect compensator for the photo sensor element 4a and the photo sensor element 4d for the photo sensor element 4b. The effect by a defect is not completely removed but can be suppressed within an allowable range if the photo sensor element 4c is very close to the symmetrical position of the photo sensor element 4a and so are the photo sensor elements 4b and 4d. It means that it is better for each element to be as narrow as possible. It is true that the defect would be canceled if the photo sensor element 4d is used as a compensator for the photo sensor 4a and the photo sensor 4c for the photo sensor 4b, but the focus error signal would be also canceled. The merit of the construction is that only one phase detection circuit is required.

Figure 14:
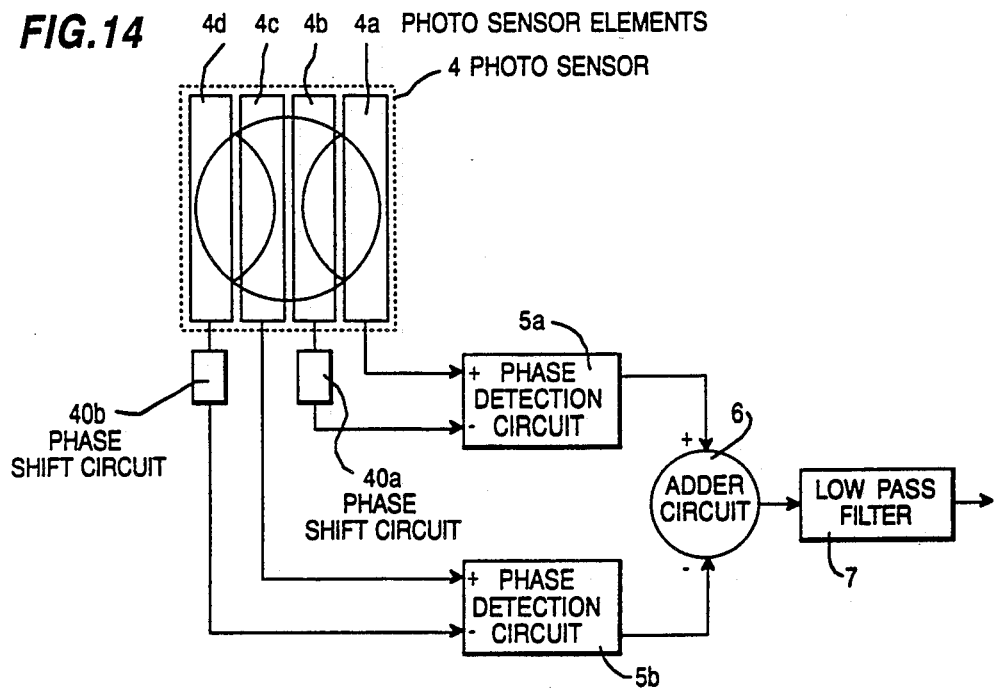
FIG. 14 is a block diagram showing an embodiment of an apparatus in accordance with the fifth embodiment.

A fifth embodiment of the present invention will now be described. FIG. 14 is a partial block diagram of the fifth embodiment. The photo sensor elements 4b and 4d are connected to a phase shift circuits 40a and 40b at their outputs respectively. Functions of other members, such as the phase detection circuits 5a, 5b, the adder circuit 6, and the low-pass filter 7, are the same as those in FIG. 2.

Figure 15:
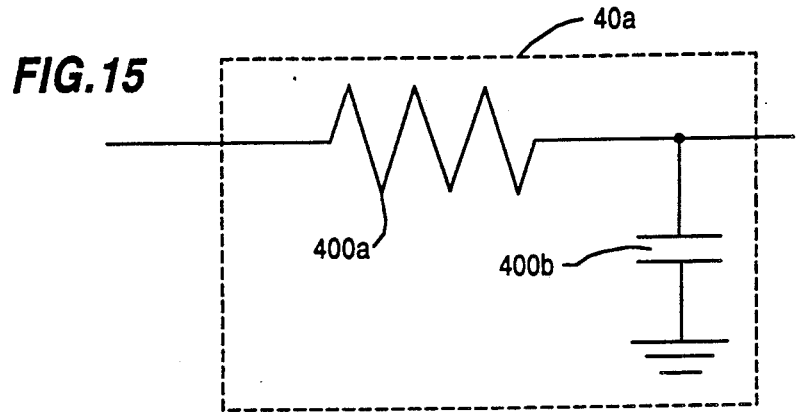
FIG. 15 is a block diagram showing a part of the embodiment in FIG. 14.

As described in the explanation of the second embodiment, there yields focusing offset in the case that the depth or height of the pit is not $n\lambda/4$ or the information structure is not made of black/white marks and still the size of the pits is more than the wavelength of the light beam. In the fifth embodiment, the phase shift circuits 40a, 40b are used in order to cancel phase differences between the outputs from those elements which cause the focusing offset. Each phase shift circuit can be realized easily using a low-pass filter or a high-pass filter. An example of the phase shift circuit 40a is illustrated in FIG. 15. The phase shift circuit 4a is a low-pass filter made of a resistor 400a and a capacitor 400b.

Figure 16:
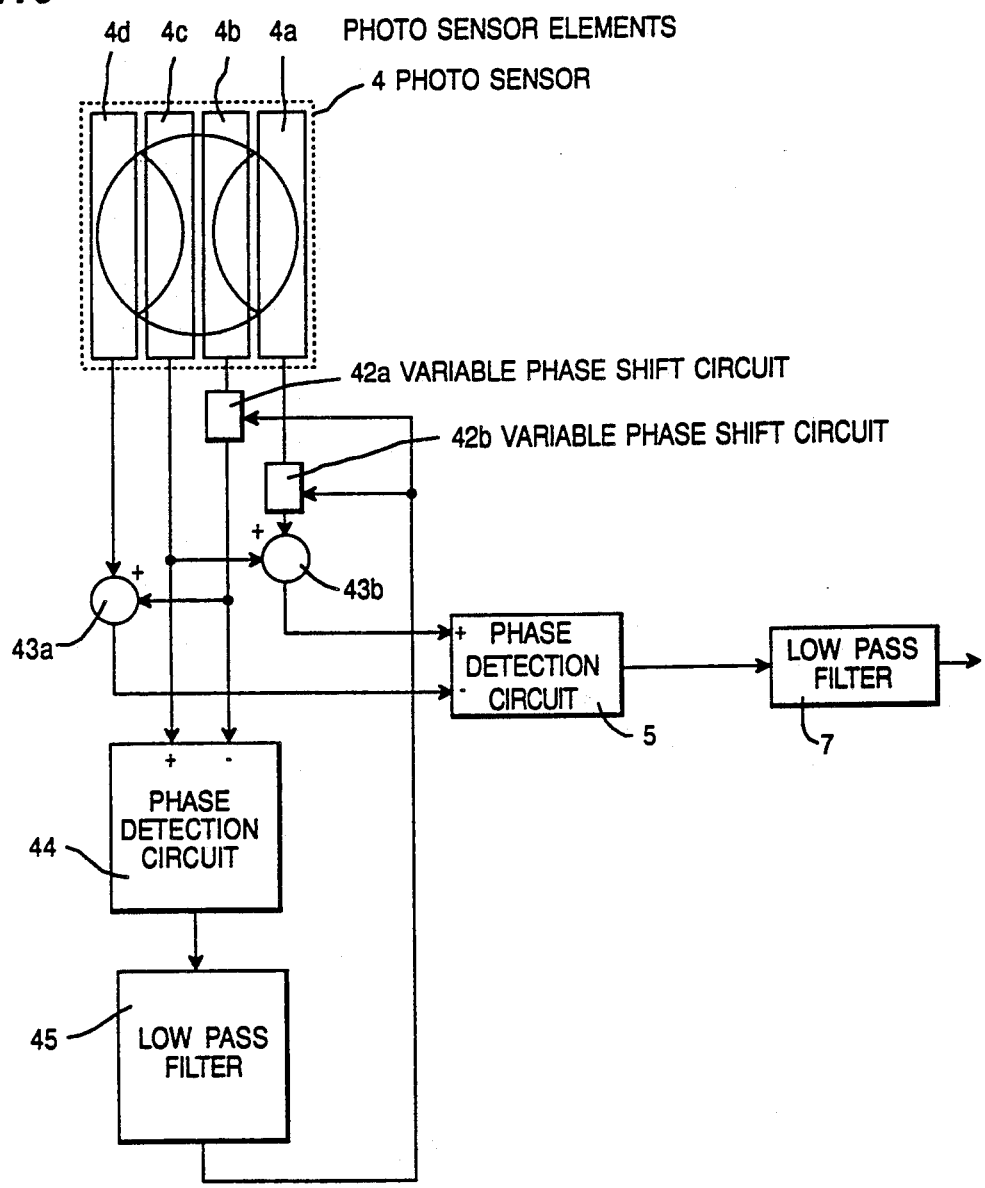
FIG. 16 is a block diagram showing an embodiment of an apparatus in accordance with the sixth embodiment.

A sixth embodiment of the present invention will now be described. FIG. 16 is a partial block diagram of the sixth embodiment. This embodiment shows still another technique to reduce the focusing offset. The photo sensor elements 4c and 4d are connected to variable phase shift circuits 42a and 42b at their outputs respectively. The variable phase shift circuits 42a, 42b add phase advance or phase delay on their input signals in accordance with external signals imposed on their control terminals. An output from the photo sensor element 4b is fed to the positive input of a phase detection circuit 44 and an output from the photo element 4c passed through the variable phase shift circuit 42a is fed to the negative input of the phase detection circuit 44. An output from the phase detection circuit 44 is smoothed by a low-pass filter 45 and fed back to the control terminals of the variable phase shift circuits 42a and 42b so as to minimize the phase difference between the positive and negative inputs of the phase detection circuit 44. The output from the photo sensor element 4a and the output from the photo sensor element 4c passed through the variable phase compensation circuit 42a are added by an adder circuit 43a and fed to a positive input of a phase detection circuit 5. Similarly, the output from the photo sensor element 4b and the output from the photo sensor element 4d passed through the variable phase compensation circuit 42b are added by an adder circuit 43b and fed to a negative input of the phase detection circuit 5. An output from the phase detection circuit 5 after smoothed by a low-pass filter is a focusing error signal.

This embodiment derives from the fourth embodiment. In the fourth embodiment, the outputs from the photo sensor elements 4a, 4c are added to each other and so are the photo sensor 4b, 4d. However, due to the mutual phase differences, the magnitude of the added outputs (inputs of the phase detection circuit 5) is smaller than that when it were not for the phase differences. When those outputs become smaller, the S/N ratio of the focus error signal will be deteriorated.

According to this embodiment, a phase difference minimizing feedback loop prevents the focusing error signal from deterioration. As described in the second embodiment, the phase difference between the inner elements—elements 4b and 4c—seldom varies in accordance with the focusing error. Therefore the phase difference between the inner elements can be regarded as an offset (phase error) detection signal. The loop constituted by the variable phase shift circuits 42a, phase detection circuit 44, the low-pass filter 45 functions as a negative feedback loop to minimize the phase error between the positive and negative inputs of the phase detection circuit 44. The variable phase shift circuit 42b, outside of the loop, is controlled by the same control signal and advances or delays the phase of the output from the photo sensor element 4d. Although the phase compensation value for the output of the photo sensor element 4d is not defined by the feed-back loop but by estimation, it is possible to minimize the phase difference as possible.

Concerning the fourth embodiment, there is other ways to improve the S/N ratio of the focus detection. FIG. 17 shows a seventh embodiment of the invention. The negative feedback loop is not the unique way to realize the phase compensation. According to this embodiment, proper phase-shift values for compensation are estimated from the direct outputs of the inner elements 4b, 4c by an estimation circuit 46. If the estimation circuit defines proper phase compensation values for the variable phase shift circuit, phase differences between the element 4a and the element 4c and between the element 4b and the element 4d can be reduced within an allowable range. The estimation circuit 46, for example, can be realized by a phase detection circuit and a ROM (read only memory) table. The phase detection circuit detect the phase difference between the two elements and then proper phase compensation values are produced referring to the ROM table.

What is claimed is:

1. An apparatus for reproducing an information signal optically from the track shaped information structure on a record carrier, said apparatus comprising:
    objective means for reading said information structure on said record carrier;

photo sensor means divided to first through fourth elements aligned sequentially in the direction of an image of said track in a far field for converting said light beam diffracted by said information structure to electric signals, said first element and said second element being disposed in a half area of said far field image divided by a plane including an optical axis of said objective means, said third element and said fourth element being disposed in another half area of said far field image; and phase detection means for deriving a focus error signal by detecting phase differences among outputs from said first through fourth elements.

2. An apparatus for reproducing an information signal optically from a track shaped information structure on a record carrier, said apparatus comprising:

radiation source means for emitting a light beam;

objective lens for focusing said light beam on said information structure;

photo sensor means divided to first through fourth elements aligned sequentially in the direction of an image of said track in a far field for converting said light beam diffracted by said information structure to electric signals, said first element and said second element being disposed in a half area of said far field image divided by a plane including an optical axis of said objective means, said third element and said fourth element being disposed in another half area of said far field image;

first phase detection means for deriving a phase detection signal between outputs of said first element and said second element;

second phase defection means for deriving a phase detection signal between outputs of said third element and said fourth element; and adder means for adding outputs from said first and second phase detection means to obtain a focusing error signal.

3. An apparatus according to claim 2, wherein said photo sensor elements are arranged symmetric about an optical axis of said objective lens.

4. An apparatus for reproducing an information signal optically from a track shaped information structure on a record carrier, said apparatus comprising:

radiation source means for emitting a light beam;

objective lens for focusing said light beam on said information structure;

photo sensor means divided to first through fourth elements in the direction of a far field image of said track for converting said light beam diffracted by said information structure to electric signals;

first phase detection means for deriving a phase difference signal between outputs from said first and fourth photo sensor elements;

second phase detection means for deriving a phase difference signal between outputs from said second and third photo sensor elements;

first amplifier means for amplifying said phase detection signal from said first phase detection means with a proper gain;

second amplifier means for amplifying said phase detection signal from said second phase detection means with a proper gain different from the gain of said first amplifier means; and adder means for adding electrically two electric signals from said first and second amplifier means to obtain a focusing error signal.

5. An apparatus according to claim 4, wherein said photo sensor elements are arranged symmetric about an optical axis of said objective lens.

6. An apparatus according to claim 4, wherein the gain of said second amplifier means is variable in accordance with whether or not a track following servo is under operation.

7. An apparatus for reproducing an information signal optically from a track shaped information structure on a record carrier, said apparatus comprising:

radiation source means for emitting a light beam;

an objective lens for focusing said light beam on said information structure;

photo sensor means divided to first through fourth elements sequentially in the direction of a far field image of said track for converting said light beam diffracted by said information structure to electric signals, an output of said first element and an output of said third element being added substantially, an output of said second element and an output of said fourth element being added substantially; and phase detection means for deriving a phase difference signal between said added outputs from said first and third elements and said added outputs from second and fourth elements to obtain a focus error signal.

8. An apparatus according to claim 6, wherein said photo sensor elements are arranged symmetric about an optical axis of said objective lens.

* * * * *